United States Patent
Yu et al.

(10) Patent No.: US 10,531,530 B2
(45) Date of Patent: Jan. 7, 2020

(54) CONTROLLING A POWER ADAPTOR LIGHT-EMITTING DIODE (LED) INDICATOR

(71) Applicant: Dell Products, L.P., Round Rock, TX (US)

(72) Inventors: Wei-Cheng Yu, New Taipei (TW); Tsung-Cheng Liao, Taoyuan (TW); Merle Jackson Wood, III, Round Rock, TX (US); Wen-Yung Chang, Taoyuan (TW)

(73) Assignee: Dell Products, L.P., Round Rock, TX (US)

( * ) Notice: Subject to any disclaimer, the term of this patent is extended or adjusted under 35 U.S.C. 154(b) by 131 days.

(21) Appl. No.: 15/723,987

(22) Filed: Oct. 3, 2017

(65) Prior Publication Data
US 2019/0104586 A1     Apr. 4, 2019

(51) Int. Cl.
*H02J 7/02*      (2016.01)
*H05B 33/08*   (2006.01)
*H02J 7/00*      (2006.01)

(52) U.S. Cl.
CPC ........ *H05B 33/0842* (2013.01); *H02J 7/0036* (2013.01); *H02J 7/0047* (2013.01); *H02J 7/0052* (2013.01); *H05B 33/0806* (2013.01); *H02J 2007/0039* (2013.01); *H02J 2007/0062* (2013.01)

(58) Field of Classification Search
CPC ........ G06F 1/266; G06F 1/305; G06F 13/385; G08B 5/36; H02J 7/022
USPC .................................. 320/107; 307/112, 149
See application file for complete search history.

(56) References Cited

U.S. PATENT DOCUMENTS

| | | | |
|---|---|---|---|
| 2005/0017676 A1* | 1/2005 | Takimoto | H02J 7/0031 320/107 |
| 2012/0170323 A1* | 7/2012 | Iida | H01F 27/2804 363/16 |
| 2012/0212349 A1* | 8/2012 | Chang | H01R 13/6691 340/654 |
| 2012/0229079 A1* | 9/2012 | Chin | H01R 4/4818 320/107 |
| 2013/0328415 A1* | 12/2013 | Lee | H02J 7/022 307/130 |
| 2016/0233707 A1* | 8/2016 | Kidakarn | H02J 7/0047 |
| 2016/0241148 A1* | 8/2016 | Kizilyalli | H05K 5/0247 |
| 2017/0108910 A1* | 4/2017 | Goh | G06F 1/266 |

* cited by examiner

*Primary Examiner* — Tung X Le
(74) *Attorney, Agent, or Firm* — Fogarty LLP (57) ABSTRACT

Systems and methods for controlling a power adaptor Light-Emitting Diode (LED) indicator are described. In some embodiments, a method may include: detecting a coupling of a power adaptor to a voltage source; setting a plurality of transistors in a first configuration, where the first configuration provides power an LED coupled to the power adaptor via a cable; detecting a de-coupling of the power adaptor from the voltage source; and setting the plurality of transistors in a second configuration, where the second configuration ceases to provide power to the LED.

22 Claims, 13 Drawing Sheets

CONTROLLING A POWER ADAPTOR LIGHT-EMITTING DIODE (LED) INDICATOR

FIELD

The present disclosure generally relates to Information Handling Systems (IHSs), and, more particularly, to systems and methods for controlling a power adaptor Light-Emitting Diode (LED) indicator.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The Universal Serial Bus (USB) standard defines cables, connectors, and protocols usable for communications and power transfers between different information handling systems and/or other electronic devices. For example, the USB Type-C (USB-C) specification describes USB-C cables that contain a full set of wires and a controller.

A USB-C power adapter receives utility power (or any other power source), converts it into another form (e.g., from AC to DC), and then provides it to an information handling system (or battery) over a USB-C cable. In some cases, a USB-C cable may include a Light-Emitting Diode (LED) that indicates a communication or power status of the USB interface. These LED indicators are powered via dedicated wires within the USB-C cable.

SUMMARY

Embodiments of systems and methods for controlling a power adaptor Light-Emitting Diode (LED) indicator are described. In an illustrative, non-limiting embodiment, a method may include: detecting a coupling of a power adaptor to a voltage source; setting a plurality of transistors in a first configuration, where the first configuration provides power to an LED coupled to the power adaptor via a cable; detecting a de-coupling of the power adaptor from the voltage source; and setting the plurality of transistors in a second configuration, where the second configuration ceases to provide power to the LED.

In some implementations, the power adaptor may be an Universal Serial Bus Type-C (USB-C) power adaptor, and the voltage source may be an Alternating Current (AC) source.

The plurality of transistors may include a first transistor, a second transistor, and a third transistor. The first transistor may be coupled to an input voltage rail (Vin) and to a Configuration Channel (CC) output line of a communication port via a first wire within the cable, and the CC output line may be coupled to the LED. The second transistor may be coupled to a CC input line of the communication port and the LED via a second wire within the cable. The third transistor may be coupled to the CC input line and to the CC output line via a third wire within the cable.

In the first configuration, the first and third transistors may be non-conductive and the second transistor may be conductive. In the second configuration, the first and third transistors are conductive, and the second transistor is non-conductive.

In another illustrative, non-limiting embodiment, a power adaptor may include, a power cable; and a power adaptor coupled to the power cable, the power adaptor having an electronic circuit configured to communicate with an Information Handling System using a communication cable, where the electronic circuit is configured to: detect a coupling of the power cable to a voltage source; set a plurality of transistors in a first configuration, where the first configuration provides electrical power to an LED coupled to the communication cable; detect a de-coupling of the power cable from the voltage source; and set the plurality of transistors in a second configuration, wherein the second configuration ceases to provide the electrical power to the LED.

In yet another non-limiting, illustrative embodiment, an electronic circuit may include: an input section having an input voltage terminal and a CC input terminal; an output section having an output voltage terminal and a CC output terminal; and a logic circuit coupled between the input section and the output section, the logic circuit configured to: set a plurality of transistors in a first configuration, where the first configuration causes the CC output terminal to provide electrical power to an LED; and set the plurality of transistors in a second configuration, where the second configuration causes the CC output terminal to cease to provide the electrical power to the LED.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein comprise systems and methods for controlling a power adaptor Light-Emitting Diode (LED) indicator. For example, these systems and methods can control a Universal Serial Bus Type-C (USB-C) Power Delivery (PD) adaptor's Light-Emitting Diode (LED) indicator through a Configuration Channel (CC) wire. An USB-C cable's otherwise conventional CC line/wire may be also used to control the LED without interfering with CC line communications between the adapter and an Information Handling System (IHS), while maintaining compliance with industry standards and specifications. In other words, in some implementations, these techniques enable multi-function operation of the same CC line for both the LED driver and for digital communications.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
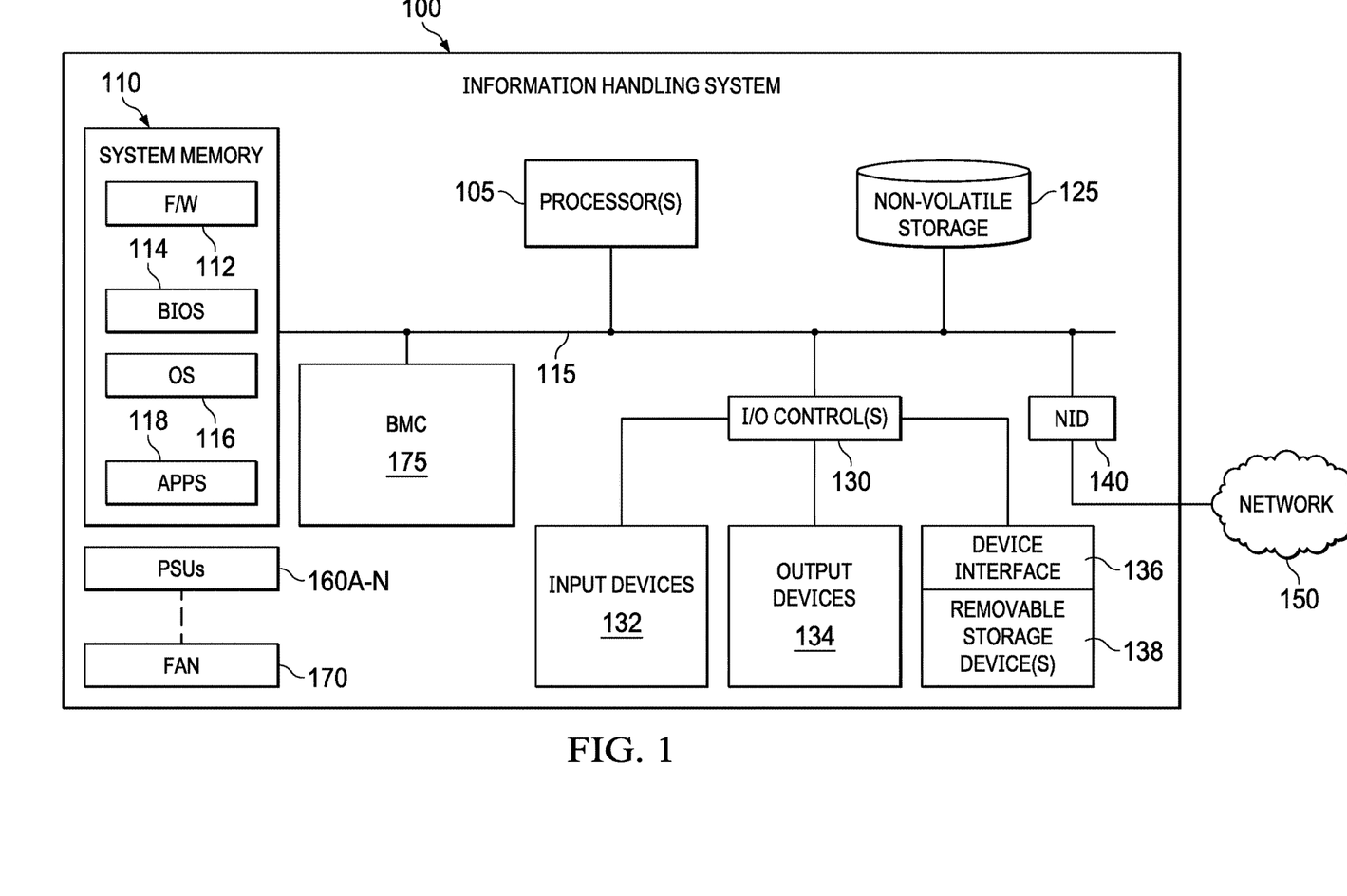
FIG. 1 is a diagram of examples of components of an Information Handling System (IHS) according to some embodiments.

FIG. 1 is a block diagram of examples of components of an Information Handling System (IHS), according to some embodiments. Particularly, IHS 100 includes one or more processor(s) 105 coupled to system memory 110 via system interconnect 115. System interconnect 115 may include any suitable system bus.

System memory 110 may include a plurality of software and/or firmware modules including firmware (F/W) 112, basic input/output system (BIOS) 114, operating system (O/S) 116, and/or application(s) 118. Software and/or firmware module(s) stored within system memory 110 may be loaded into processor(s) 105 and executed during operation of IHS 100.

IHS 100 includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device, a camera, a microphone, or audio speaker(s) (not shown).

Additionally, one or more device interfaces 136, such as an optical reader, a Universal Serial Bus (USB) port or interface, a card reader, Personal Computer Memory Card International Association (PCMCIA) slot, and/or a high-definition multimedia interface (HDMI), may be included or coupled to IHS 100. Device interface(s) 136 are utilized to enable data to be read from or stored to removable storage device(s) 138, such as a compact disk (CD), digital video disk (DVD), flash drive, or flash memory card. Device interfaces 136 may include General Purpose I/O interfaces such as an Inter-Integrated Circuit ($I^2C$), a System Management Bus (SMBus), or Peripheral Component Interconnect (PCI) buses.

IHS 100 comprises Network Interface Device (NID) 140. NID 140 enables IHS 100 to communicate and/or interface with other devices, services, and components that are located externally to IHS 100. These devices, services, and components can interface with IHS 100 via an external network, such as network 150, which may include a local area network, wide area network, personal area network, the Internet, etc.

IHS 100 further includes two or more PSUs 160A-N. PSUs 160A-N are coupled to BMC 175 via an $I^2C$ bus. BMC 175 enables remote operation control of PSUs 160A-N and other components within IHS 100. PSUs 160A-N power the electronic hardware components of IHS 100 (i.e., processor(s) 105, system memory 110, non-volatile storage 125, NID 140, I/O CTL(s) 130, etc.). To assist with maintaining temperatures within specifications, an active cooling system, such as fan 170 may be utilized.

BMC 175 may be configured to provide out-of-band management facilities for IHS 100. Management operations may be performed by BMC 175 even if IHS 100 is powered off, or powered down to a standby state. BMC 175 may include a processor, memory, an out-of-band network interface separate from and physically isolated from an in-band network interface of IHS 100, and/or other embedded resources.

In certain embodiments, BMC 175 may include or may be part of a Remote Access Controller (e.g., a DELL Remote Access Controller (DRAC) or an Integrated DRAC (iDRAC)). In other embodiments, BMC 175 may include or may be an integral part of a Chassis Management Controller (CMC).

Figure 2:
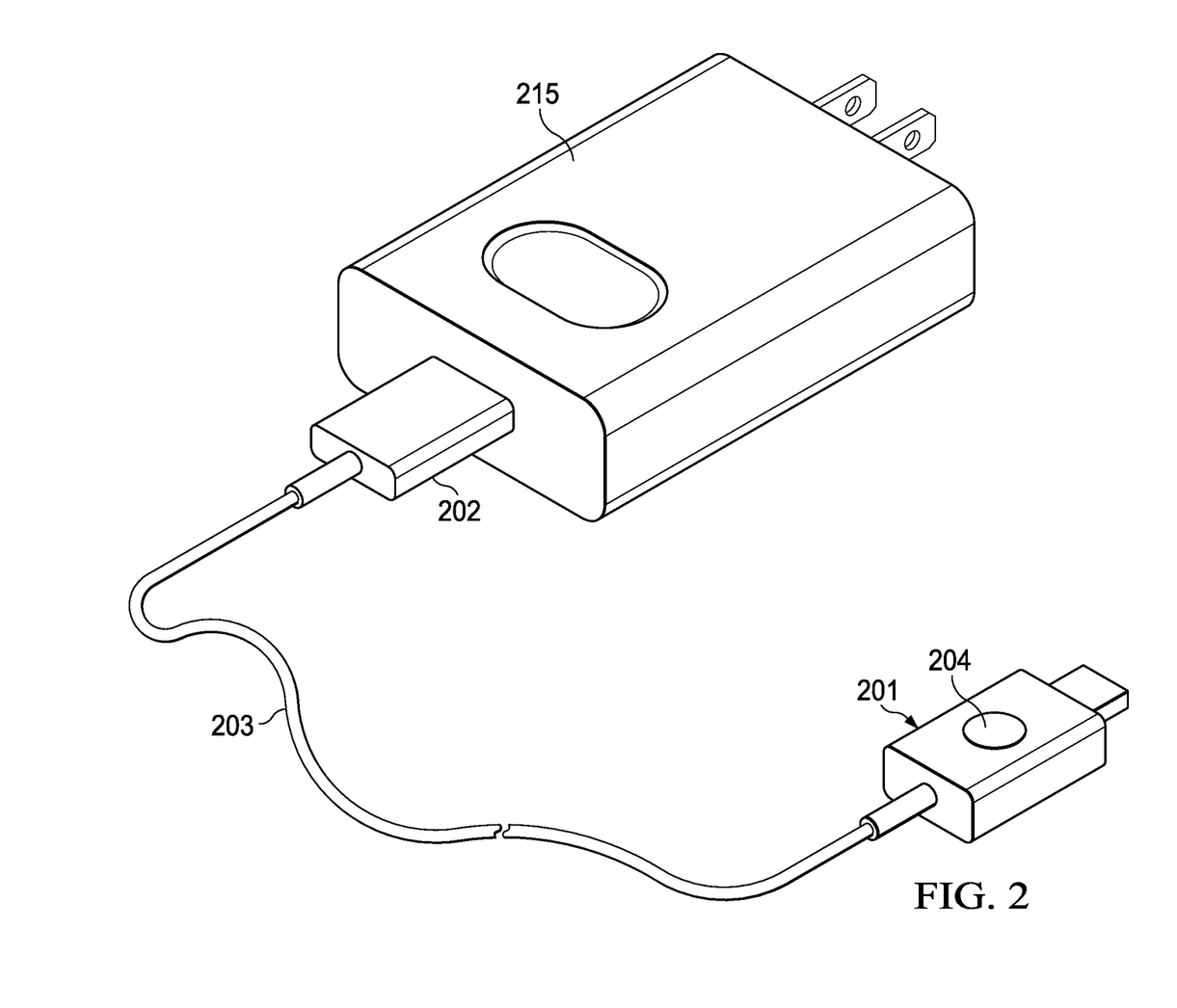
FIG. 2 is a diagram of an example of an Universal Serial Bus Type-C (USB-C) charging system having a Light-Emitting Diode (LED) indicator according to some embodiments.

FIG. 2 is a diagram of an example of a USB power system including USB-C power adaptor or barrel 215, and USB-C cable 203. Cable 203 has connectors 201 and 202 on each end, and LED indicator 204 is coupled to connector 201. In this implementation, the USB power system can deliver electrical power from a first power source (e.g., an Alternating Current (AC)) to an IHS, for example, via the IHS's USB port.

However, the output voltage behavior of USB-C power adaptor 215 differs from conventional power adaptors. For example, unlike traditional AC adaptors, when USB-C power adaptor 215 is plugged into an AC source, LED indicator 204 is expected to stay turned on so long as cable 203 is coupled to USB-C power adaptor 215, regardless of whether the other end of cable 203 is also connected to an IHS or other device to be powered. Conventional USB-C power systems have addressed this expectation by providing a 5 V rail over a separate wire inside of a conventional USB cable, and the additional dedicated wire controls the LED indicator.

Traditional AC adaptors also use a metal-oxide-semiconductor field-effect transistor (MOSFET), also known as a "blocking" MOSFET, to block their internal voltages from reaching the cable until the other rend of the cable is attached to an IHS. Accordingly, the dedicated 5 V LED wire mentioned above is connected ahead of the MOSFET to provide power to the LED. Once the cable is plugged into an IHS, the power adapter negotiates power with IHS, at which time the MOSFET is turned on, allowing power onto the source wire.

In the event a power adapter's overcurrent protection (OCP) or overvoltage protection (OVP) protection is tripped, the MOSFET opens to block voltage from the source wire. However, since voltage is still present before the MOSFET, the LED continues to light, which is not desirable. In this case, the customer must unplug the traditional AC adaptors to reset it, but because the LED is still lit, it is not intuitive to do so. The systems and methods described herein addresses this condition, as well as the LED's turning off in response to a OVP/OVP condition.

Figure 3:
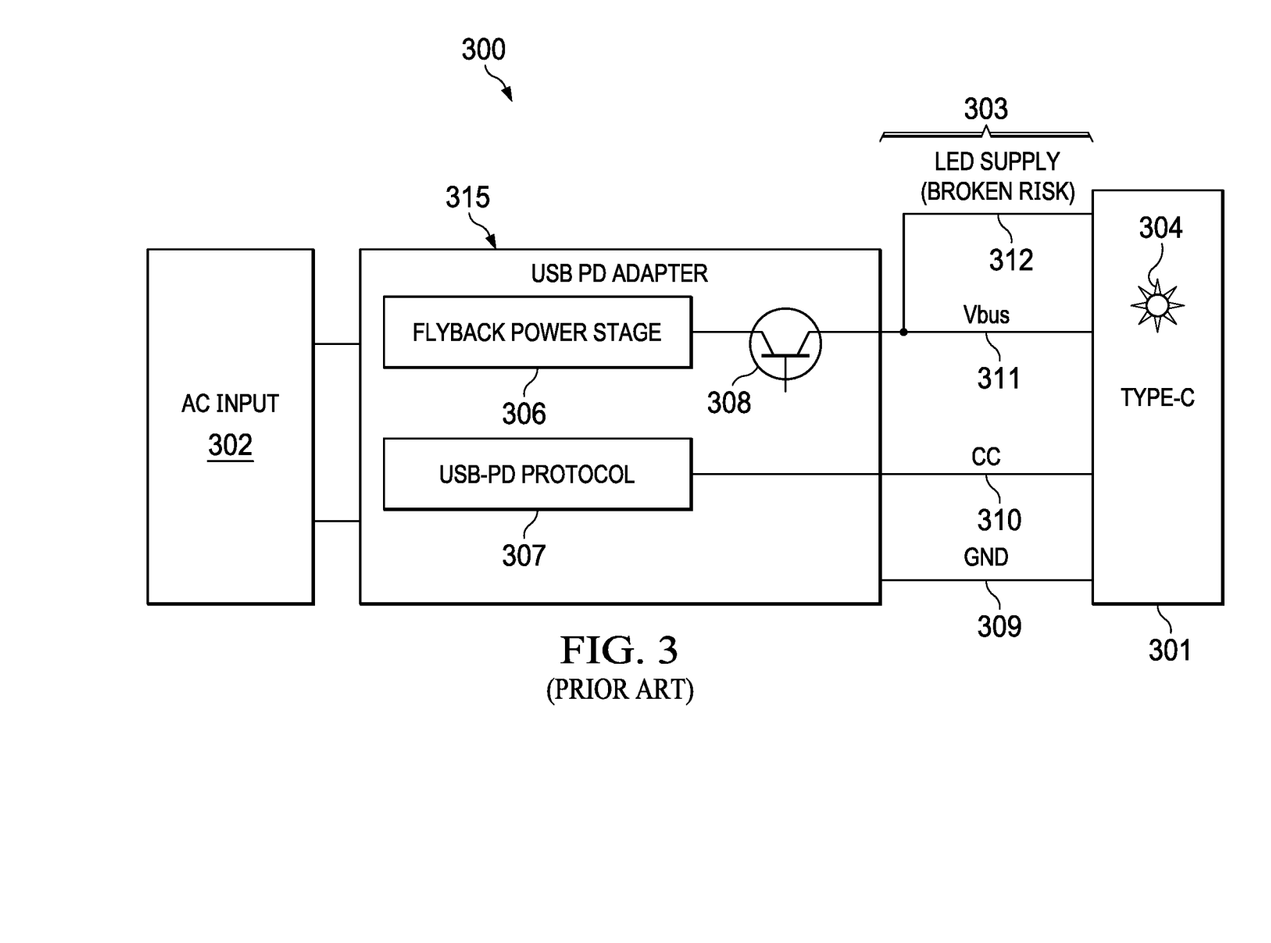
FIGS. 3 and 4 are diagrams of conventional USB power adaptor systems.
Figure 4:
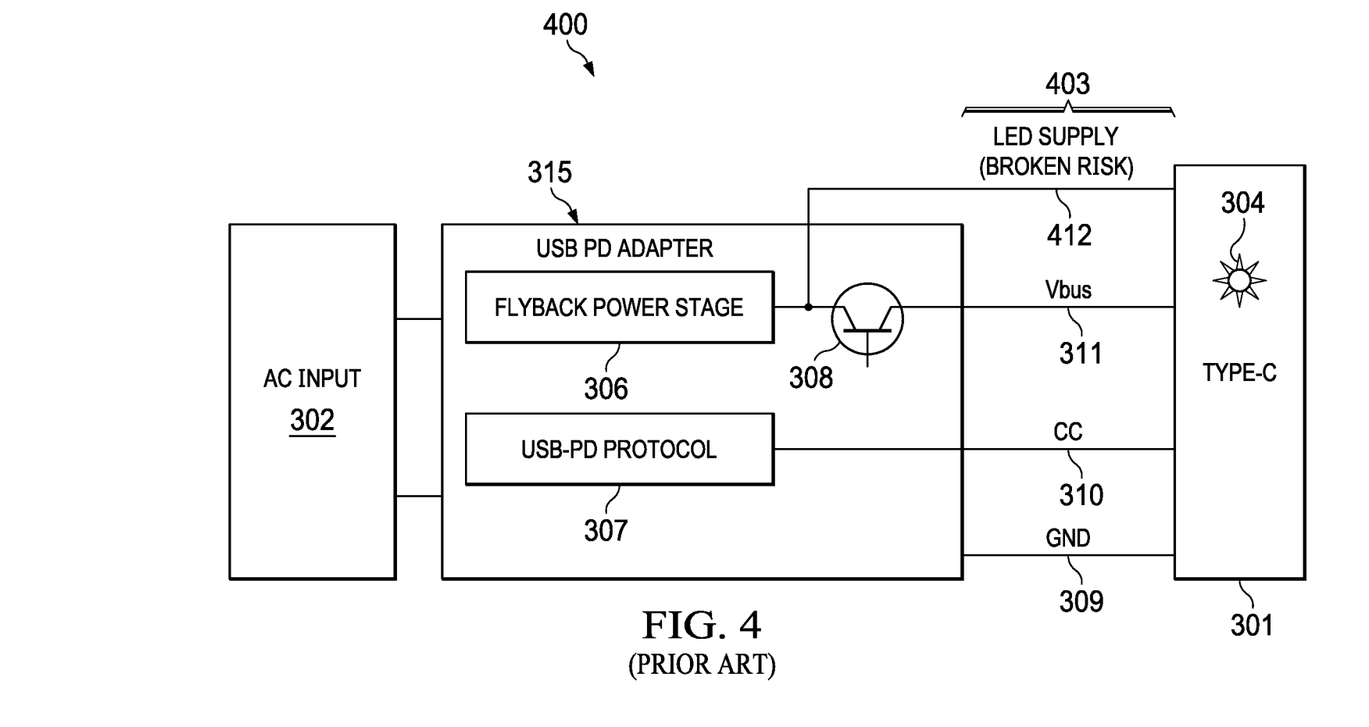

FIGS. 3 and 4 are diagrams of conventional USB power adaptor systems 300 and 400, respectively. Both systems 300 and 400 are coupled to AC input 302, and both systems also include flyback power state module 306, USB Power Delivery (PD) protocol module 307, MOSFET 308, USB-C connector 301, and LED indicator 304.

In system 300, cable 303 includes the following wires: ground 309, Configuration Channel (CC) 310, bus voltage (Vbus) 311, and dedicated LED supply wire 312. However, in system 400, LED wire 312 is replaced with dedicated LED supply wire 412 to differentiate them from each other. In system 300, dedicated LED supply wire 312 is coupled to USB PD adaptor 315 after MOSFET 308, wherein in system 400, dedicated LED supply wire 312 is coupled to USB PD adaptor 315 before MOSFET 308. In both cases, dedicated LED supply wire 312 and dedicated LED supply wire 412 are subject to breaking.

If the LED wire location is connected after blocking MOS of the AC adapter (dedicated LED supply wire 312), the LED light on the type-c end cable cannot be in operation when the type C connector is not plugged into system because the blocking MOS is turned off. And, according to the USB-C standard, the AC adapter cannot turn on the output to cable prior to plugging into system/device, thus blocking MOSFET must remain off. The LED is off when adapter is plugged into AC, but it is not connected to system, and therefore system 300 is not acceptable from a user perspective, as users expect the LED to be lit when plugged in.

Operation of system 300 is shown in Table I below, where undesired behavior is indicated by an asterisk (LED is not powered up when C Adapter is disconnected from system):

TABLE I

| Operation of System 300 | | | |
|---|---|---|---|
| | DC Power Cord (Unplugged) | DC Power Cord (Plugged in) | Protection (OCP/SCP/OVP) |
| Type-C Adapter | *LED(Off) | LED (On) | LED (Off) |
| Barrel Adapter | LED (On) | LED (On) | LED (Off) |

If the LED wire location is connected before blocking MOS of the AC adapter (dedicated LED supply wire 412), the Type-C Adapter LED light will not be turned off when entering protection mode such as OVP/OCP/SCP. The blocking MOS is turned off to stop providing power to the system, but power still appears at dedicated LED supply wire 412 (e.g., a 5 V wire) because it just latches off the Blocking MOSFET instead of latching off all the power brick.

Operation of system 400 is shown in Table II below, where undesired behavior is indicated by an asterisk (LED is still lit after OVP/SCP/OVP protection):

TABLE II

| Operation of System 400 | | | |
|---|---|---|---|
| | DC Power Cord Unplugged | DC Power Cord Plugged in | Protection (OCP/SCP/OVP) |
| Type-C Adapter | LED(On) | LED (On) | *LED (On) |
| Barrel Adapter | LED (On) | LED (On) | LED (Off) |

To address these and other problems associated with systems 300 and 400, various system and methods described herein, CC line/signal 310 is also used to drive the LED light, while still allowing for normal CC wire communication and connector orientation.

Figure 5:
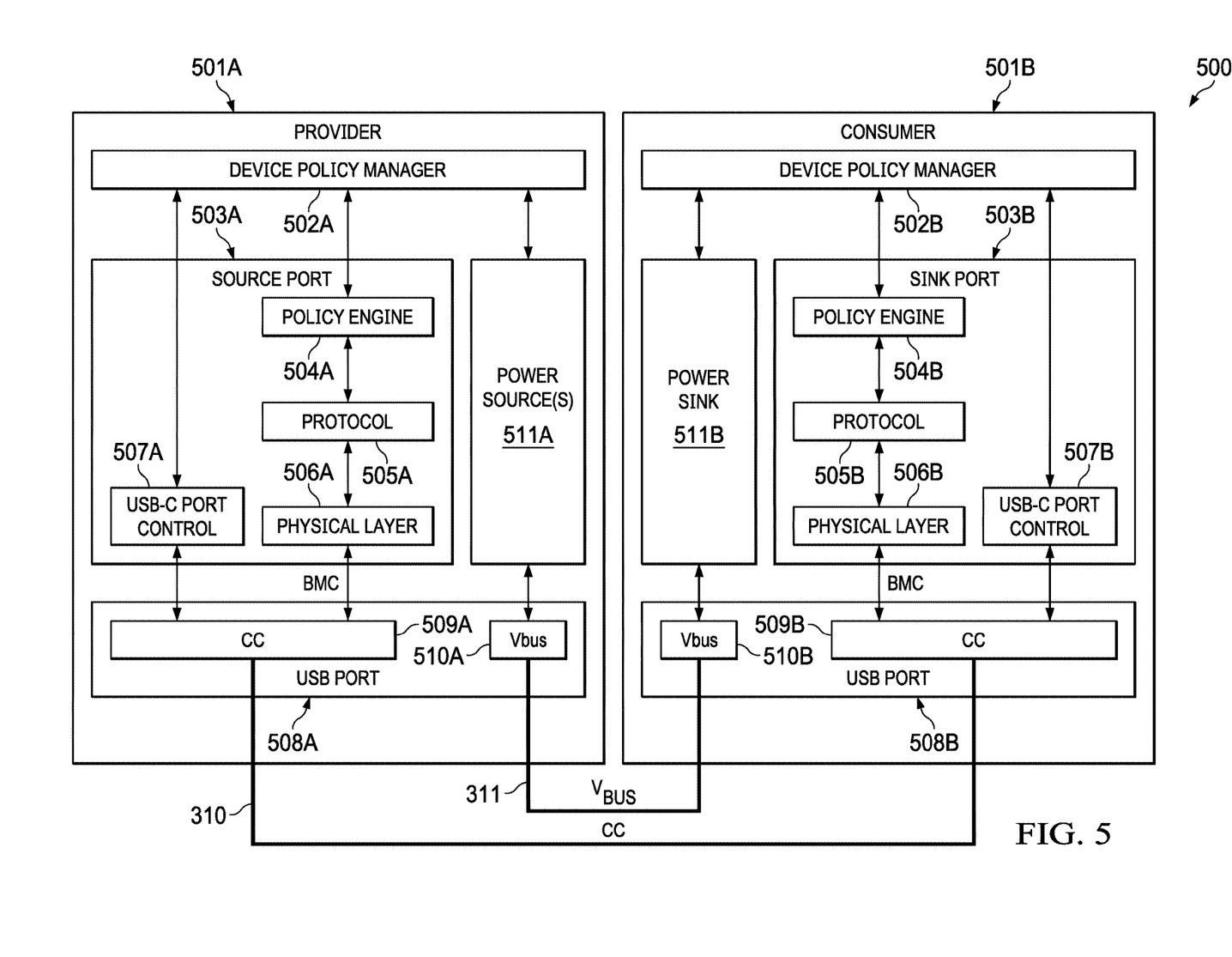
FIG. 5 is a diagram of examples of components of a USB-C interface according to some embodiments.

FIG. 5 is a diagram of examples of components of USB interface 500 according to some embodiments. Particularly, power provider 501A represents an USB-C interface of power adaptor system 600 described below, whereas power consumer 501B represents another USB-C interface of an IHS coupled to power adaptor system 600. In this case, provider 501A is coupled to a consumer 501B via Vbus 311 and CC 310.

As shown, USB interfaces 501A-B include: device policy manager 502A-B, source port 503A-B, policy engine 504A-B, protocol 505A-B, physical layer 506A-B, USB-C Port Control 507A-B, USB port 508A-B, CC 509A-B, and VBus 510A-B. Provider 501A includes power source(s) 511A, and consumer 501B includes power sink 511B.

FIGS. 6-9 are diagrams of examples of power adaptor system 600 with cable 603 having LED indicator 604, according to some embodiments. Particularly, power adaptor system 600 includes USB PD adapter 615 that includes flyback power state 306, USB-PD protocol 607, and blocking MOSFET 308. USB-PD protocol 607 may be configured to perform certain conventional functions, in addition to other features described below. As a result of these additional functions, cable 603 may include as few as only three wires: ground 309, Vbus 311, and CC 610. This is contrast with conventional power systems 300 and 400, which need cable 303 to have an extra, dedicated LED supply wire.

Referring back to FIG. 6, Type-C connector's CC line/signal 610 is configured to perform a handshaking operation between USB PD adapter 615 (provider 501A) and consumer 501B (which may be coupled to USB-C connector 601, but is not shown here for sake of succinctness). Once these two entities have reached an agreement, provider 501A sends a correct negotiated voltage to consumer 501B over Vbus 311. The CC line 610 is also used to establish connector orientation, because the USB-C connector is reversible.

Figure 6:
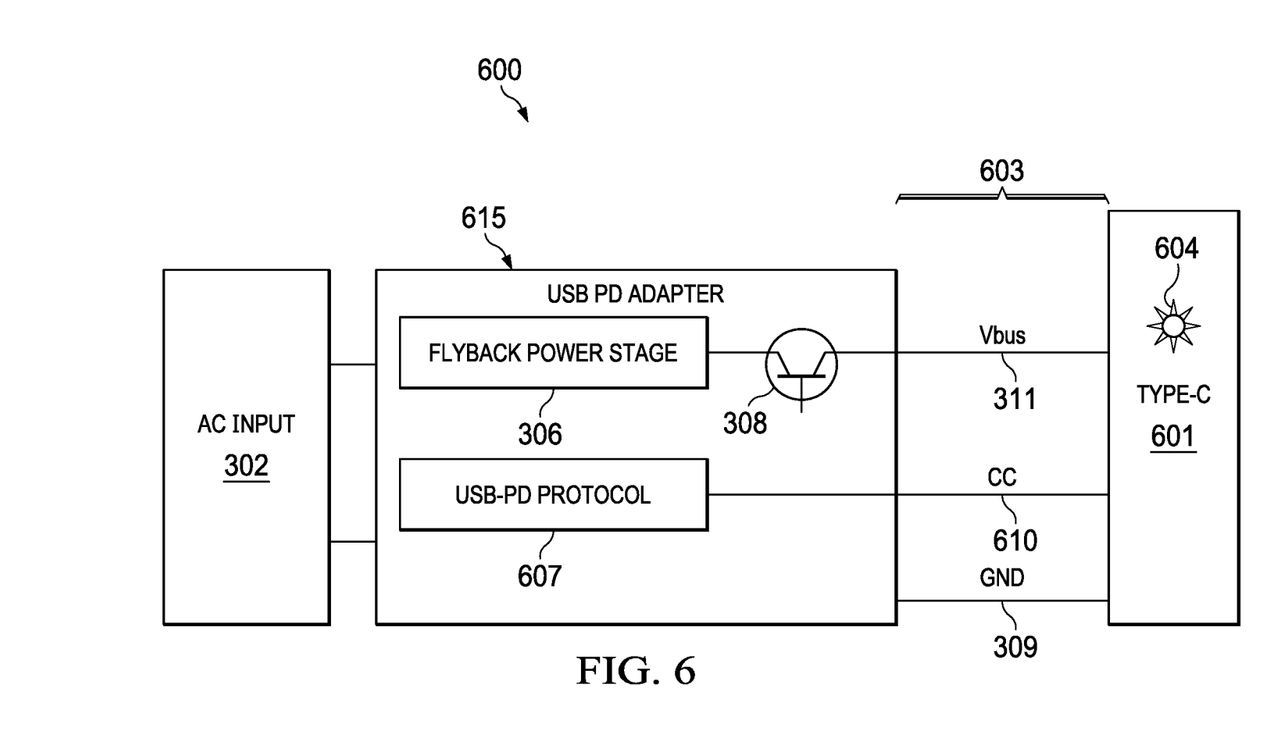
FIGS. 6-9 are diagrams of examples of a USB-C power adaptor system with an LED indicator according to some embodiments.

Moreover, USB PD adapter 615 uses CC line 610 to enable LED 604 without interfering with CC line communications between USB PD adapter 615 and power consumer 501B, maintaining compliance with industry specification.

As such, USB PD adapter 615 allows elimination of an additional LED wires and enables LED light function through the CC line inside the DC power cord. During type-C connector is plugged out, there is constant 1 mA current source in the PD integrated circuit (IC) to drive the LED light 604. When the type-C connector is plugged in, PD IC's constant current switches to 300 uA. The 300 uA constant current stops supporting LED light, but rather the LED draws power from Vbus 311, since now power appears on the Vbus wire.

Figure 7:
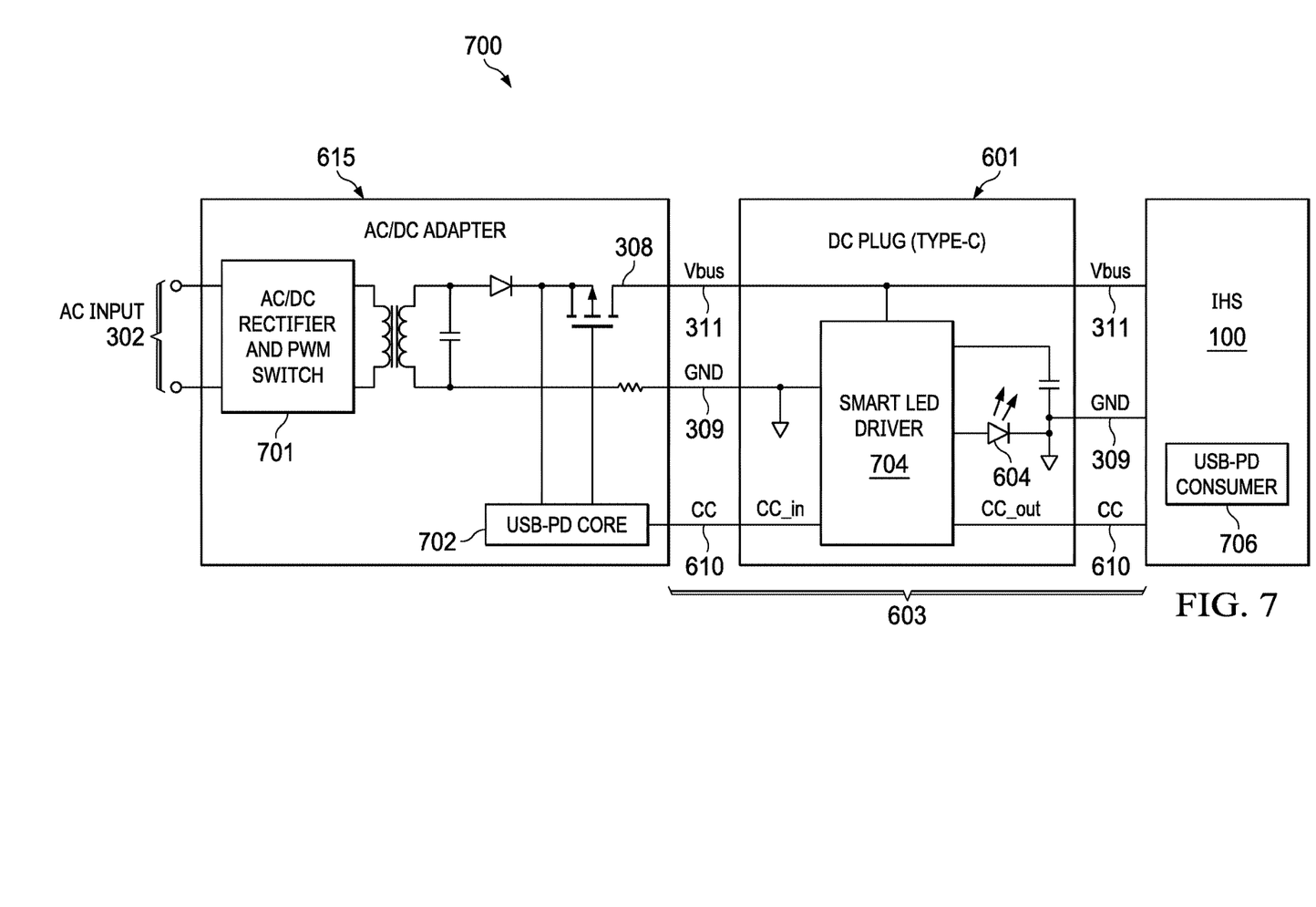

As shown in FIG. 7, circuit 700 of power adaptor system 600 shows AC/DC adapter 615 coupled to AC input 302, and to IHS 100 via cable 603. Cable 603 includes DC connector plug 601 having smart LED driver IC 704 with LED indicator 604. Cable 603, again, includes as few as three wires: ground 309, Vbus 311, and CC 610.

AC/DC adapter 615 includes AC/DC rectifier and pulse-width modulation (PWM) switch circuit 701, as well as a number of other conventional analog components, such as transforms, resistors, capacitors, etc. MOSFET 308 is coupled only to Vbus wire 311, and not to any separate, dedicated LED wire. AC/DC adapter 615 also includes USB-PD core IC 702 implementing USB interface 501A, and which controls MOSFET 308 and processes CC signals transmitted and received over CC wire 610.

DC plug 601 includes smart LED driver 704 configured to control the turning on of LED indicator 604 based, at least in part, upon an electrical current present in CC line 610. IHS 100 includes USB-PD consumer 706 implementing USB interface 501B.

Figure 8:
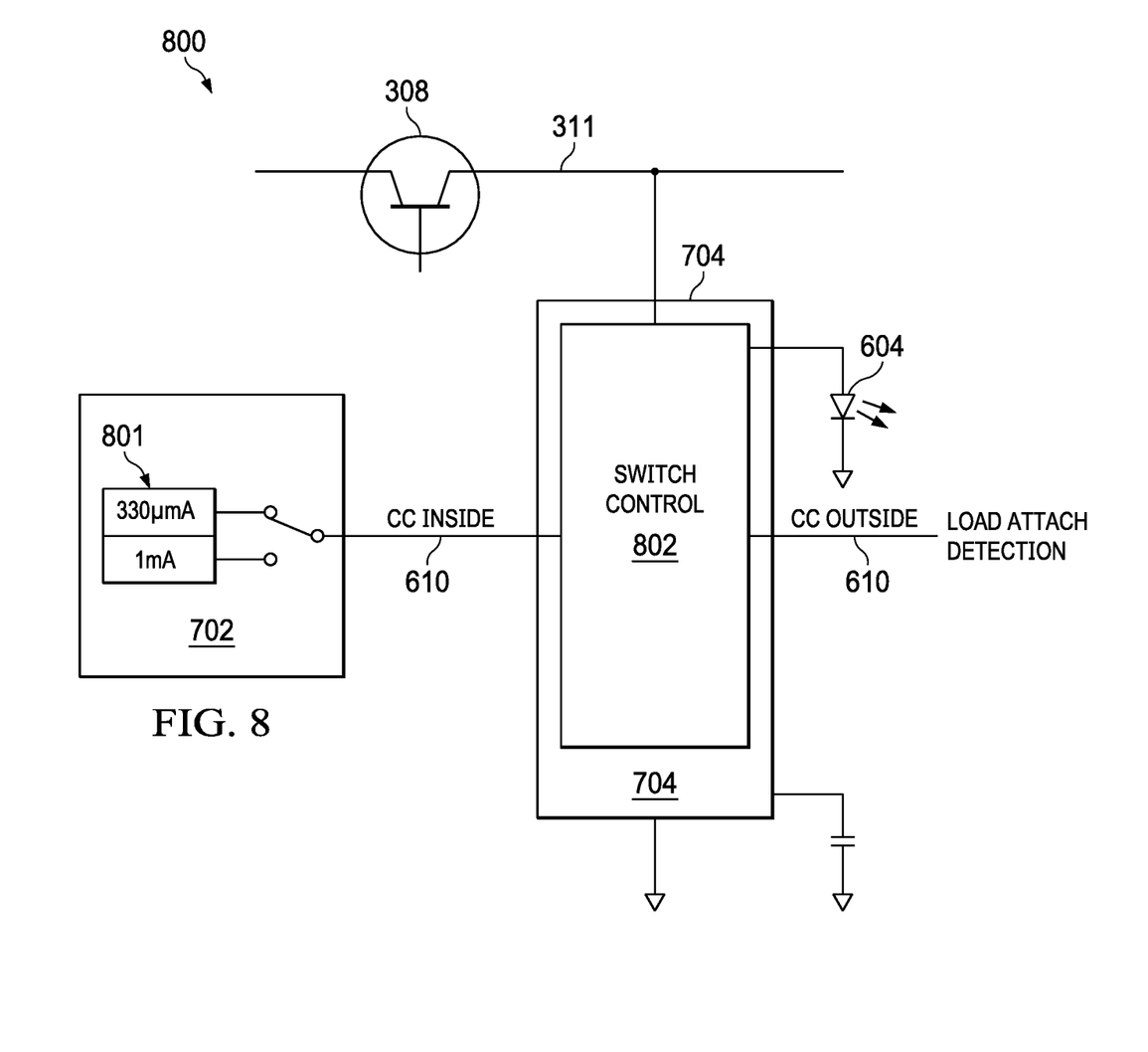

FIG. 8, shows MOSFET 308 coupled to Vbus 311, which powers LED driver IC 704 and control switch circuit 802. USB-PD core IC 702, during operation, outputs 330 µA or 1 mA as selected by switch 801. LED 604 is lit up based upon CC wire 301 when switch 801 selects the 1 mA source, and LED 604 is then lit up based upon Vbus 311 when switch 801 selects the 330 µA source during operation of AC/DC adapter 615.

Figure 9:
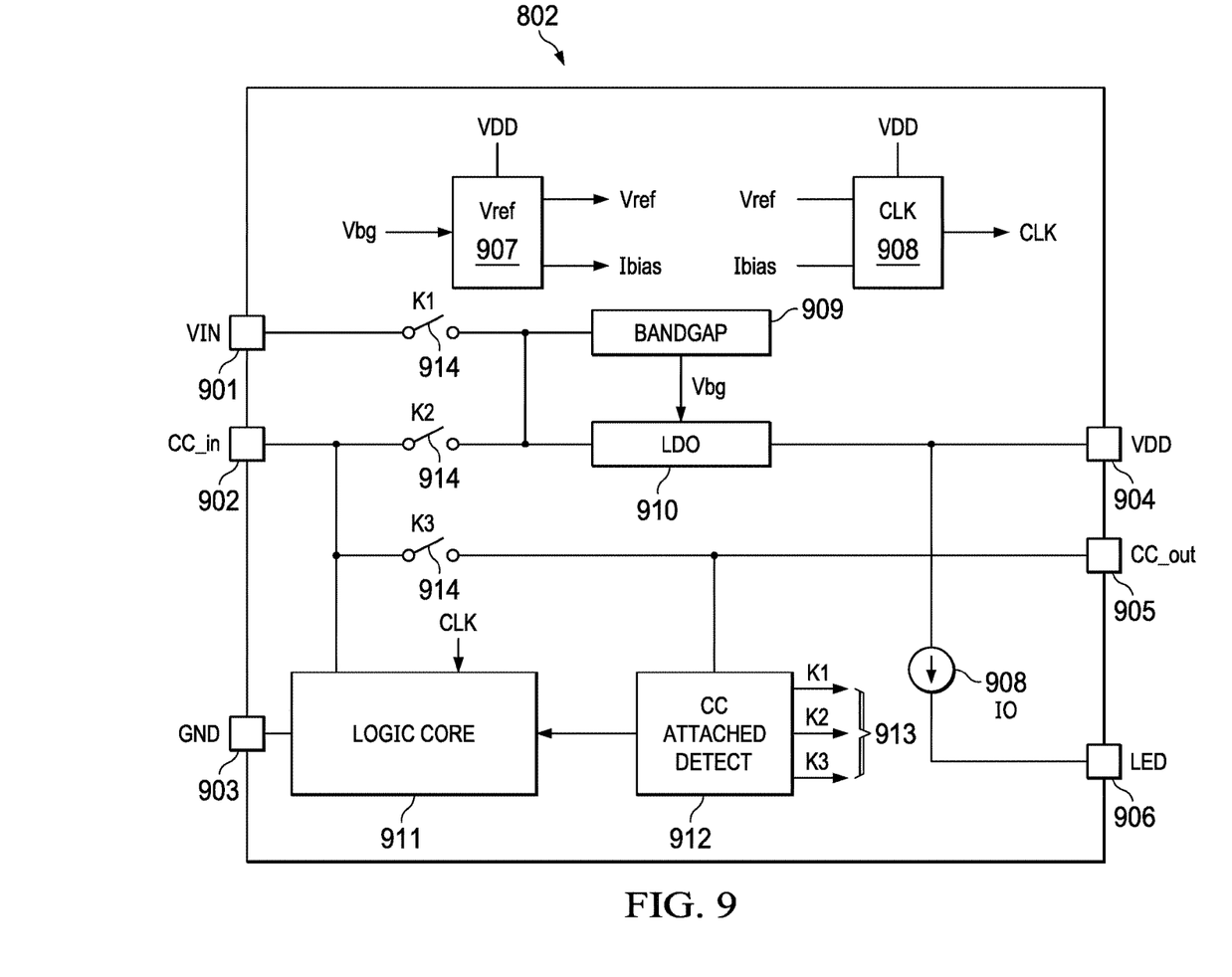

FIG. 9 shows more details of control switch circuitry 802 within LED driver IC 704. Particularly, circuit 802 includes as few as only 6 terminals: Vin 901, CC_in 902, GND 903, Vdd 904, CC_out 905, and LED terminal 906. Circuit 802 also includes voltage reference and/or regulator circuit 907, clock reference circuit 908, bandgap voltage circuit 909, low-dropout (LDO) voltage regulator 910, current source 908, logic core 911, and connection detection circuit 912.

In this embodiment, circuit 802 controls three transistors or switches K1-K3 914 using signals output by connection detection circuit 912, in response to different connections status of various components of power system 600. Specifically, transistor K1 is coupled between Vin terminal 901 and VDD terminal 904. Transistor K2 is coupled between CC_in terminal 902 and: (i) VDD terminal 904 and (ii) LED terminal 906. And transistor K3 is coupled between CC_in terminal 902 and: (i) CC_out terminal 905 and connection detection circuit 912.

Figure 10:
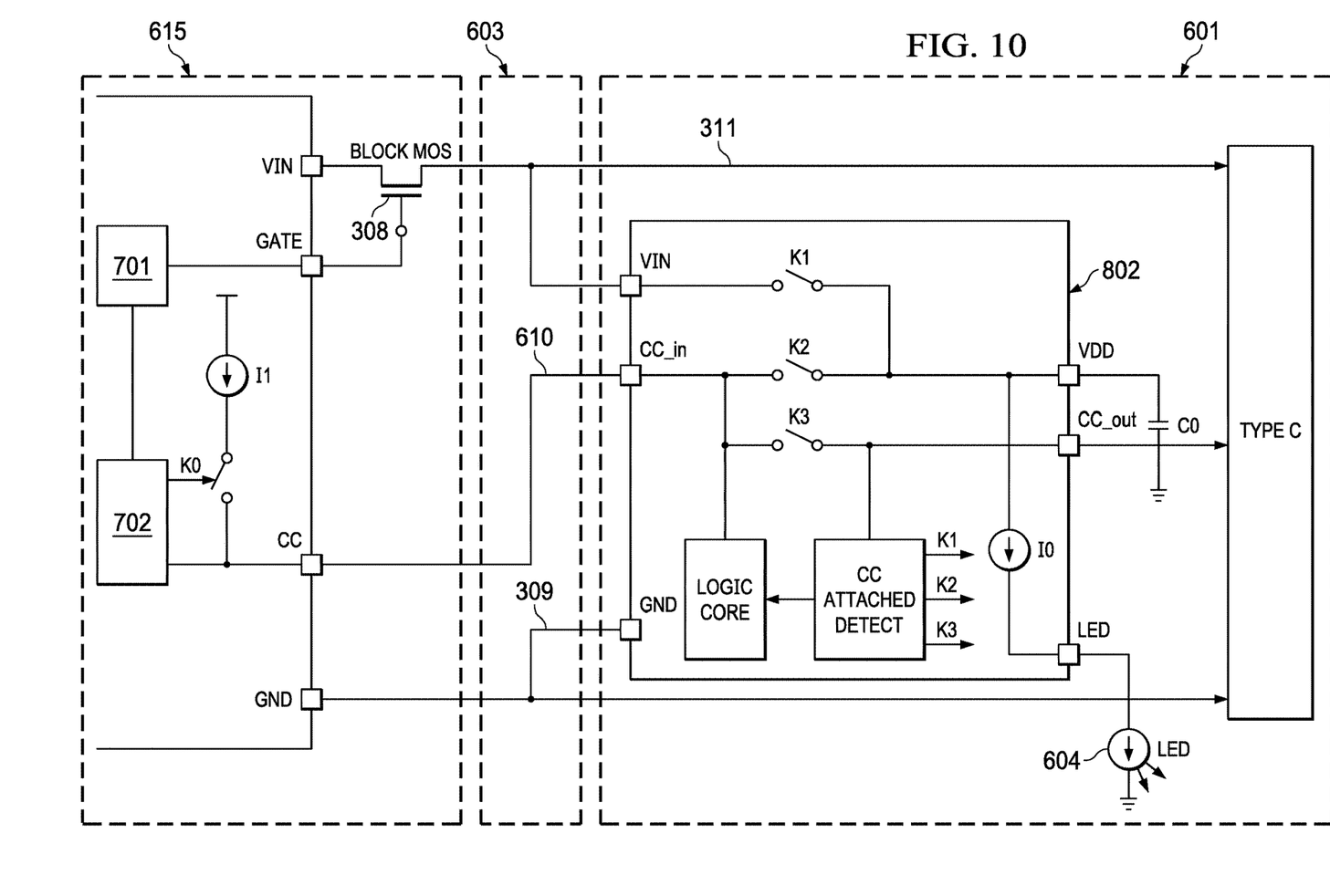
FIG. 10 is the overall combination of various components discussed in FIGS. 6-9.

As shown in FIG. 10, the overall combination of various components discussed in FIGS. 6-9 are illustrated in a single, yet non-limiting implementation 1000. As such, implementation 100 shows USB PD adapter 615 (provider 501A) having circuits 701 and 702, cable 603 with wires 309, 311, and 610, and USB-C connector 601 having control switch circuit 802 and LED indicator 604.

Figure 11:
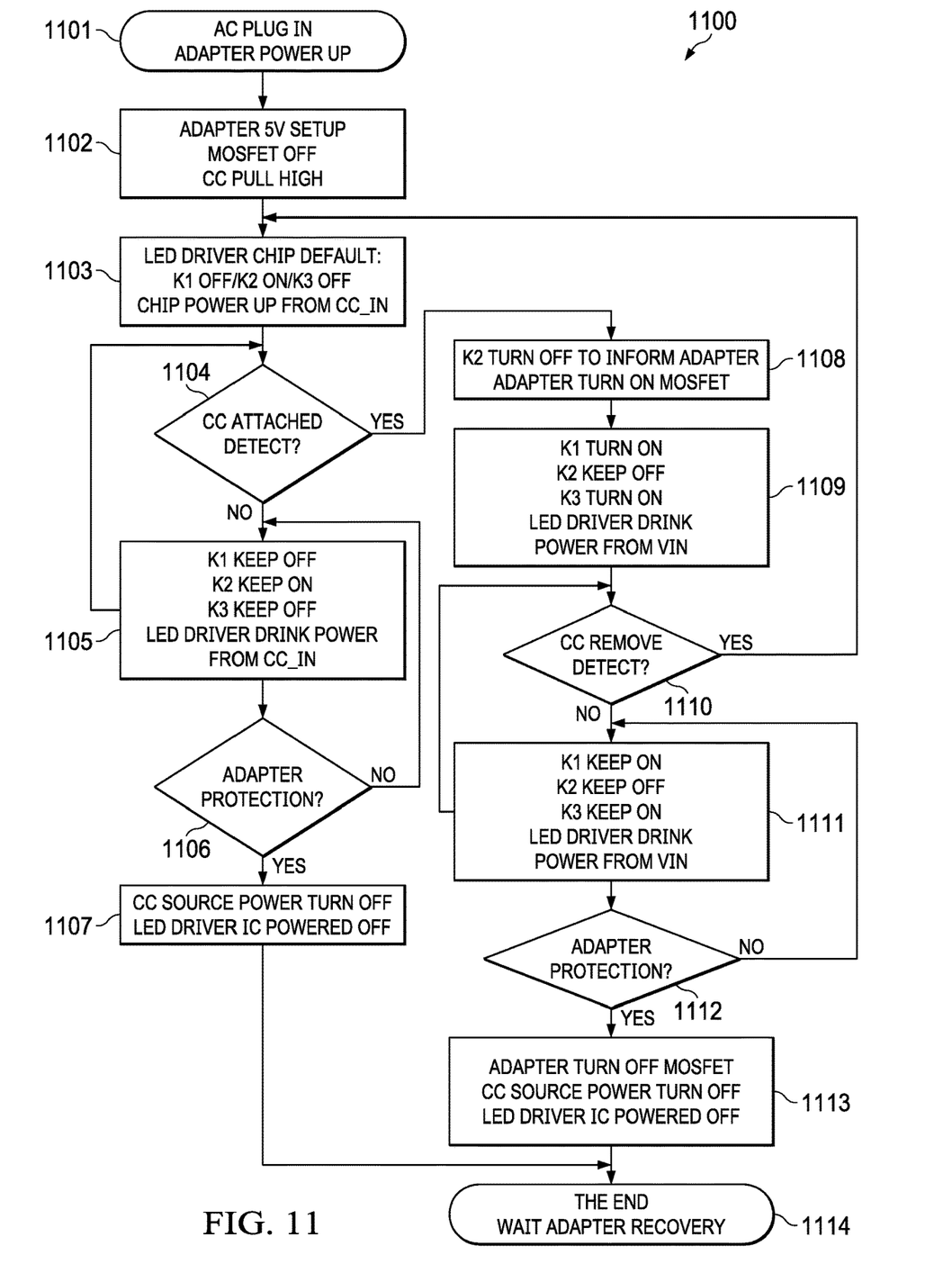
FIG. 11 is a diagram of an example of a method for controlling an LED indicator according to some embodiments.

Turning now to FIG. 11, a diagram of an example of method 1100 for controlling LED indicator 602 using USB-C adaptor power system 600 is shown, according to some embodiments. At block 1101, AC is plugged in and the adaptor powers up. At block 1102, the adaptor's 5 V setup blocking MOS is turned off and CC is pulled high. At block 1103, the LED driver chip's default configuration is: K1 is "off" (i.e., open or nonconductive), K2 is "on" (i.e., closed or conductive), and K3 is "off".

At block 1104, if CC attached is not detected, control passes to block 1105. At block 1105, LED driver chip's maintains the default configuration and LED driver consumes power from the CC wire, and control returns to block 1104 until a connection event is detected. At block 1106, if adapter protection is not invoked or detected, control returns to block 1105. Otherwise, at block 1107, the CC source power turns off, and the LED driver IC is powered off. Then, block 1114 waits for the adaptor's recovery.

If block 1104 determines that a CC attach detection has been made, block 1108 turns K2 off to inform the adaptor to turn on the MOSFET. At block 1109, the LED driver chip's assumes a second configuration where: K1 is "on", K2 is "off", and K3 is "on". As such, the LED driver now consumes power from Vin/Vbus. Block 1110 determines whether a CC removal event is detected. If so, control returns to block 1101. Otherwise, at block 1111, LED driver chip's maintains the second configuration and LED driver continues to consume power from Vin/Vbus.

At block 1106, if adapter protection is not invoked or detected, control returns to block 1111. Otherwise, at block 1113, the adapter turns the MOSFET and the CC source power off, and the LED driver IC is powered off. Again, block 1114 waits for the adaptor's recovery.

In short, method 300 allows powering the LED with a CC line power source while the PD consumer is not plugged in, and while CC line is idle and is not being used for communications. While the adapter is plugged into a wall power AC source, the USB-PD adapter setups an internal 5V standard output and keeps output blocking MOSFET off turned off. The CC pin sources power to smart LED drive circuit.

The smart LED drive has a logic core to monitor PD consumer plug and unplug events, and then configure K1/K2/K3 switch appropriately as described above. The logic core is powered by CC wire, and by default the logic core keeps K2 "on" and K1/K3 "off" The LED constant current drive is sourced from CC_IN.

The CC_out pin is internally pulled up. When a PD consumer device (e.g., an IHS) is plugged in, the CC_out voltage is pulled low by the consumer. Conversely, when the consumer device is unplugged, CC_out pulls high by the internal pull up circuit.

Once the PD consumer plug in event is detected, the logic core turns off K2 with a certain time sequence to let the PD adapter know that a device was plugged in. Then the PD adapter will turns on the MOSFET to allow power source to appear on Vbus output cable. At this point, the logic core turns on K1/K3, and K2 remains turn off. This allows the LED driver to draw power from the Vbus pin or terminal instead of the CC_in pin.

Because K3 is switched "on", CC_in and CC_out are shorted, the CC line is free for normal PD adapter and PD consumer communication. The LED current in this condition (consumer device connected) is sourced directly from Vbus through the constant current LED driver. When the PD consumer is unplugged and the event detected due to the CC wire rising high, the logic core switches K2 "on" with a certain time sequence to let PD adapter know that device was unplugged. The PD adapter turns off the blocking MOS to cut off the Vbus power to the output cable. Then the logic core switches K1/K3 "off" once again, now the power source for the LED goes back to the CC_in pin.

As pointed out above, systems and methods described allow the LED to be turned off in the event adapter protection is triggered. Once PD adapter detect any type of protection like OVP or OCP or SCP, it turns off the Vbus MOSFET as normal, and turns off K2, which powers down the LED, giving the user an indication that the AC Adapter needs attention.

Figure 12:
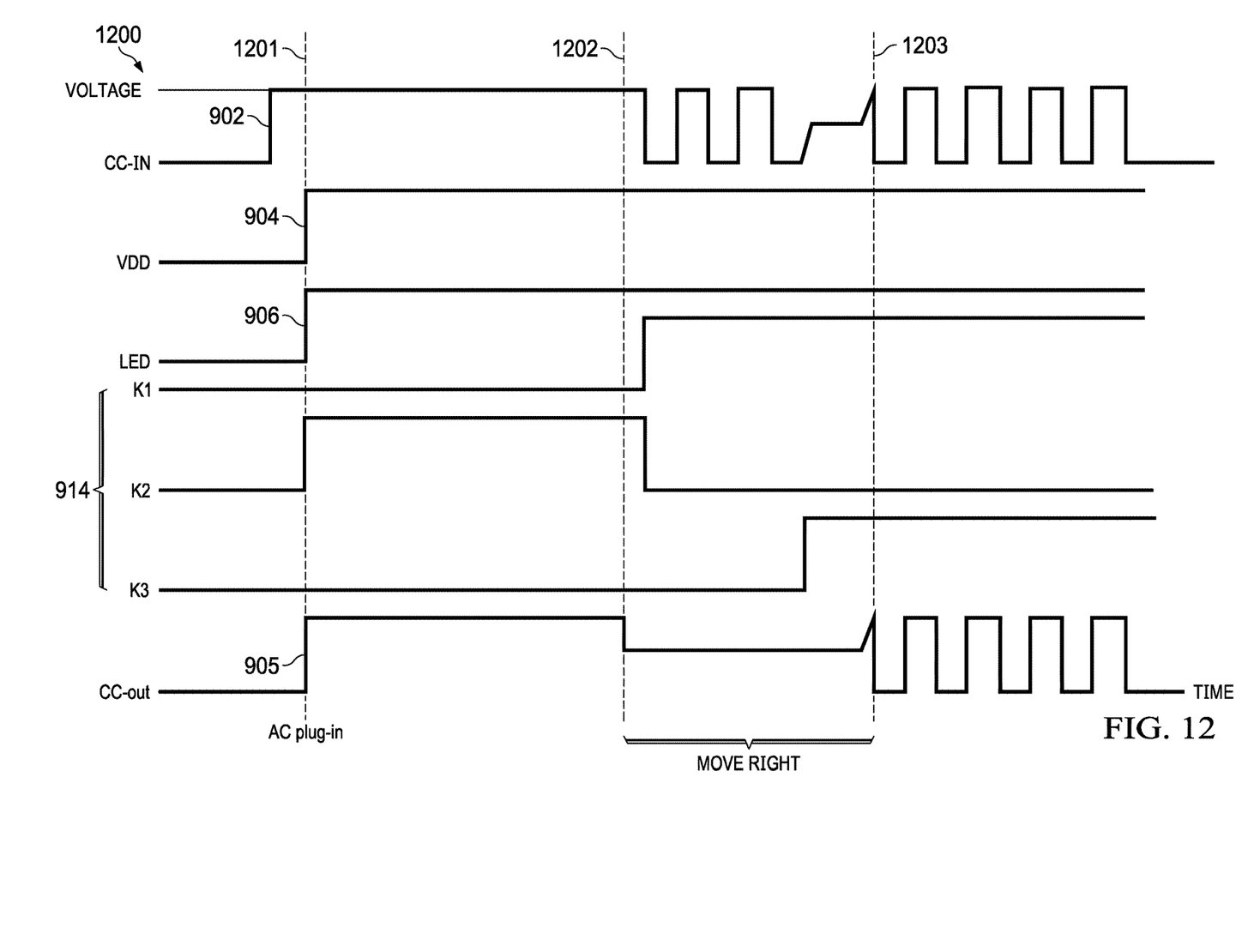
FIGS. 12 and 13 are timing diagrams illustrating the operation of the USB-C power adaptor system according to some embodiments.
Figure 13:
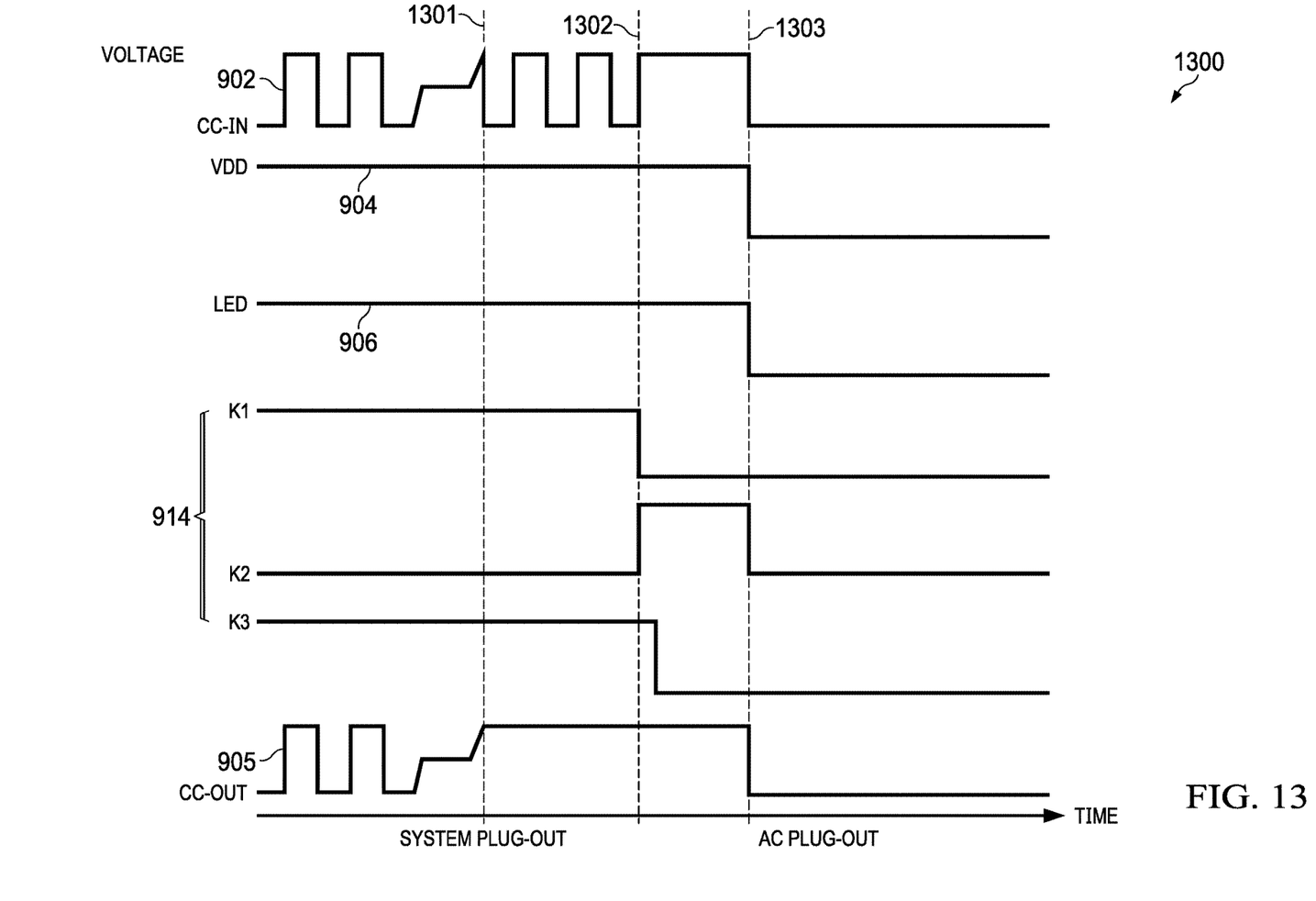

FIGS. 12 and 13 are timing diagrams illustrating the operation of the USB-C power adaptor system according to some embodiments. Particularly, diagram 1200 shows an IHS plugging sequence, and diagram 1200 shows an IHS unplugging sequence. In diagram 1200, the AC adaptor is plugged into an AC source at time 1201. When a Type-C device is plugged in at time 1202, the USB port detects the Type-C attach from the CC pin (pull down) and turns K2 "off" and K1 "on", which now powers the LED. After the logic core transition finishes at time 1203, the K3 switch is turned on, and the Vin/Vbus pin is connected to the CC pin.

In diagram 1300, when the Type-C device is unplugged at time 1301, the adapter detects the CC detached (CC pull up). After a selected amount of time, at time 1302, the adapter cuts off the MOSFET, at which time the Vbus output voltage on the output cable drops. The core logic switches K2 "on" and K1 "off", then after some de-bounce, at time 1303, turns K3 off. As such, the LED power source comes from the adapter CC wire through the K2 switch.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   providing, by a power adaptor, power to a light emitting diode (LED) configured to indicate a status of a cable via a first transistor, wherein the first transistor is coupled to a configuration channel input wire and to the LED while a terminal of the cable is decoupled from any information handling system (IHS);
   in response to a coupling of the terminal to an IHS: (a) cutting off power to the LED via the first transistor, and (b) providing power to the LED via a second transistor, wherein the second transistor is coupled to a voltage supply input wire and to the LED while the terminal is coupled to the IHS; and
   in response to a de-coupling of the terminal from the IHS: (a) cutting off power to the LED via the second transistor, and (b) providing power to the LED via the first transistor.

2. The method of claim 1, wherein the cable is a universal serial bus type-c (USB-C) cable, and wherein the voltage source is an alternating current (AC) source.

3. The method of claim 1, further comprising controlling the first transistor and the second transistor with an integrated circuit (IC).

4. The method of claim 1, wherein the first transistor couples the configuration channel input wire to the LED via a voltage regulator.

5. The method of claim 4, wherein the second transistor couples the voltage supply input wire to the LED via the voltage regulator.

6. The method of claim 5, further comprising a third transistor coupled to the configuration channel input wire and to a configuration channel output wire.

7. The method of claim 6, wherein when the first transistor is non-conductive, the third transistor is non-conductive.

8. The method of claim 6, wherein when the first transistor is conductive, the third transistor is conductive.

9. A power adaptor, comprising:
   a cable having a light emitting diode (LED) mounted thereon; and
   a power adaptor coupled to the cable and having an electronic circuit configured to:
      provide power to the LED via a first transistor, wherein the first transistor is coupled to a configuration channel input wire and to the LED while a terminal of the cable is decoupled from any device;
      in response to a coupling of the terminal to a device: (a) cut off power to the LED via the first transistor, and (b) provide power to the LED via a second transistor, wherein the second transistor is coupled to a voltage supply input wire and to the LED while the terminal is coupled to the device; and
      in response to a de-coupling of the terminal from the device: (a) cut off power to the LED via the second transistor, and (b) provide power to the LED via the first transistor.

10. The power adaptor of claim 9, wherein the cable is a universal serial bus type-c (USB-C) cable.

11. The power adaptor of claim 9, wherein the first transistor couples the configuration channel input wire to the LED via a voltage regulator.

12. The power adaptor of claim 11, wherein the second transistor couples the voltage supply input wire to the LED via the voltage regulator.

13. The power adaptor of claim 9, further comprising a third transistor coupled to the configuration channel input wire and to a configuration channel output wire.

14. The power adaptor of claim 13, wherein when the first transistor is non-conductive, the third transistor is non-conductive.

15. The power adaptor of claim 13, wherein when the first transistor is conductive, the third transistor is conductive.

16. An electronic circuit, comprising:
- an input section having a voltage supply input wire and a configuration channel input wire;
- an output section having voltage supply output wire and a configuration channel output wire; and
- a logic circuit coupled between the input section and the output section, the logic circuit configured to:
  - provide power to a light emitting diode (LED) via a first transistor, wherein the first transistor is coupled to the configuration channel input wire and to the LED while a terminal of the cable is decoupled from any device;
  - in response to a coupling of the terminal to an information handling system (IHS): (a) cut off power to the LED via the first transistor, and (b) provide power to the LED via a second transistor, wherein the second transistor (k1) is coupled to the voltage supply input wire and to the LED while the terminal is coupled to the IHS; and
  - in response to a de-coupling of the terminal from the IHS: (a) cut off power to the LED via the second transistor, and (b) provide power to the LED via the first transistor.

17. The electronic circuit of claim 16, wherein the cable is a universal serial bus type-c (USB-C) cable.

18. The electronic circuit of claim 16, wherein the first transistor couples the configuration channel input wire to the LED via a voltage regulator.

19. The electronic circuit of claim 18, wherein the second transistor couples the voltage supply input wire to the LED via the voltage regulator.

20. The electronic circuit of claim 16, further comprising a third transistor (k3) coupled to the configuration channel input wire and to a configuration channel output wire.

21. The electronic circuit of claim 20, wherein when the first transistor is non-conductive, the third transistor is non-conductive.

22. The electronic circuit of claim 20, wherein when the first transistor is conductive, the third transistor is conductive.

* * * * *